United States Patent
Hiltgen et al.

(10) Patent No.: US 9,665,380 B2
(45) Date of Patent: May 30, 2017

(54) PEER-TO-PEER NETWORK BOOTING (71) Applicant: VMware, Inc., Palo Alto, CA (US)

(72) Inventors: Daniel Kerry Hiltgen, Los Alto, CA (US); Suresh Sundriyal, Mountain View, CA (US); Wit Riewrangboonya, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 518 days.

(21) Appl. No.: 13/777,873

(22) Filed: Feb. 26, 2013

(65) Prior Publication Data
US 2014/0244989 A1    Aug. 28, 2014

(51) Int. Cl.
G06F 9/44 (2006.01)

(52) U.S. Cl.
CPC .................. G06F 9/4416 (2013.01)

(58) Field of Classification Search
CPC .. G06F 9/4416; G06F 9/4401; G06F 11/1417; G06F 9/4408; G06F 15/177; G06F 9/44
See application file for complete search history.

(56) References Cited

U.S. PATENT DOCUMENTS

| | | | |
|---|---|---|---|
| 7,111,202 B2* | 9/2006 | Cagle et al. ................ | 714/36 |
| 7,971,045 B1* | 6/2011 | Currid et al. ................ | 713/1 |
| 8,095,630 B1* | 1/2012 | Schettino ............. | G06F 9/4416 370/231 |
| 8,468,226 B2* | 6/2013 | Nagai ........................... | 709/222 |
| 2003/0188176 A1* | 10/2003 | Abbondanzio et al. ...... | 713/191 |
| 2007/0192474 A1* | 8/2007 | Decasper .............. | H04L 67/306 709/223 |
| 2008/0141015 A1* | 6/2008 | Chalemin ............. | G06F 9/4416 713/2 |
| 2008/0201571 A1* | 8/2008 | Sethuraman et al. ........... | 713/2 |
| 2008/0209196 A1* | 8/2008 | Hernandez ............ | G06F 9/4416 713/2 |
| 2009/0125616 A1* | 5/2009 | Barsness ............. | H04L 67/1063 709/222 |
| 2009/0265473 A1* | 10/2009 | Hydrie .................. | H04L 67/104 709/229 |

* cited by examiner

Primary Examiner — Fahmida Rahman
(74) Attorney, Agent, or Firm — Patterson & Sheridan LLP (57) ABSTRACT A technique for booting a computing device using a boot image that is downloaded from a distributed network booting system involves identifying a tracker computing device that manages a plurality of computing devices that store all or a portion of the boot image, receiving from the tracker computing device information about one or more computing devices from which to download the boot image, and downloading the boot image from the one or more computing devices.

6 Claims, 6 Drawing Sheets

PEER-TO-PEER NETWORK BOOTING

BACKGROUND

Booting or bootstrapping is the process of starting up a computing device from a halted or powered-down condition and loading an operating system into system memory of the computing device. A computing device may be booted from a local source, for example, a hard disk that is part of the computing device, or from a remote source, for example, network storage as in a network boot.

One network booting technique that allows computing devices to boot and run from network storage is referred to as image-based network booting. In an image-based network boot, when the computing device is powered on, the computing device downloads an image of the operating system from the network storage using protocols like PXE/TFTP/BOOTP. The computing device then extracts the operating system from the image and loads the operating system into system memory for execution.

The benefits of network booting include central management and storage of an operating system and files of the operating system. If an anti-virus scanning of operating system files is needed, the scanning is carried out just once. They also permit computers to operate without local disks and provide an administrator control over what operating system files to make available to users. Further, they allow for easy swap-outs of defective computing devices since a replacement computing device may simply be configured to download and subsequently execute the same operating system image that the defective computing device was configured to download.

Despite the foregoing benefits, these well-known technologies continue to suffer from a variety of problems. Consider, for example, a computer system that includes a single central storage server and a number of computing devices connected thereto, where unbooted computing devices are configured to download boot images from the central storage server. In this example, the central storage server represents a single point of failure. Another problem arises during situations where the unbooted computing devices attempt to download a boot image from the central storage server substantially at the same time. This may occur, for example, after a power-outage that causes all of the computing devices to shut down and attempt a reboot.

One attempt to mitigate the foregoing problems involves implementing a caching proxy that is logically disposed between the computing devices and the central storage server. In particular, the caching proxy monitors the transfer of boot images between the unbooted computing devices and the central storage server and stores copies of the transferred boot images. In this way, subsequent requests made by the unbooted computing devices for boot images on the central storage server can be intercepted and served by the caching proxy instead of the central storage server. Hence, utilization of cache proxies may help reduce the average load imposed on the central storage server. Unfortunately, computer systems that implement cache proxies still suffer from some of the same problems described above. Consider, for example, a single caching proxy that has cached only a subset of the boot images that are available on the central storage manager. In the event of a failure of the central storage manager, any unbooted computing devices that require boot images that are not stored at the caching proxy are unable to execute a boot. Moreover, cache proxies are high in complexity and cost, which severely degrades potential scalability of computer systems that employ a large number of computing devices.

SUMMARY

Accordingly, disclosed herein is a technique for a peer-to-peer network-based booting technique for delivering a boot image to an unbooted computing device. In particular, the unbooted computing device is configured to interface with a "tracker" computing device that maintains information about "seed" computing devices that contain boot images and "peer" computing devices that possess and are willing to serve the boot image to the unbooted computing device. In some cases, the tracker computing device may instruct the unbooted computing device to download portions of the boot image from two or more peer computing devices. A tracker computing device may identify a peer computing device as being a seeder computing device if the peer computing device can offer for download the full boot image to other peer computing devices. When at least two peer computing devices are not available, the tracker computing device may instead instruct the unbooted computing device to download the boot image from a seeder computing device, for example, a dedicated server that stores the boot image. After the unbooted computing device downloads the complete boot image, the computing device may report back to the tracker computing device that it is willing to serve the boot image—either in whole or in part—to other unbooted computing devices that are requesting the same boot image.

A method of booting a computing device by way of a boot image that is downloaded from a distributed network booting system, according to an embodiment, includes the steps of identifying a tracker computing device that manages a plurality of computing devices, wherein each of the computing devices stores at least a portion of the boot image, receiving from the tracker computing device information about at least one of the plurality of computing devices from which to download the boot image, and downloading the boot image from the at least one of the plurality of computing devices.

A method of managing a distributed network boot system that includes a plurality of computing devices, according to an embodiment, includes the steps of receiving a first request from a first computing device to download a boot image, identifying from the plurality of computing devices one or more computing devices that are capable of serving the boot image to the first computing device, and transmitting to the first computing device information about the one or more computing devices in order to enable the first computing device to download the boot image from the one or more computing devices that are capable of serving the boot image.

A distributed network booting system, according to an embodiment, that comprises at least one tracker computing device, a plurality of computing devices that store a boot image, and an unbooted computing device, wherein the unbooted computing device is configured to execute a bootstrap loader that requests from the tracker computing device information about computing devices from which the boot image can be downloaded, and the at least one tracker computing device is configured to respond to the request and select from the plurality of computing devices one or more computing devices that will serve the boot image to the unbooted computing device, and the unbooted computing device by way of the bootstrap loader downloads the boot image from the one or more computing devices.

DETAILED DESCRIPTION

Figure 1:
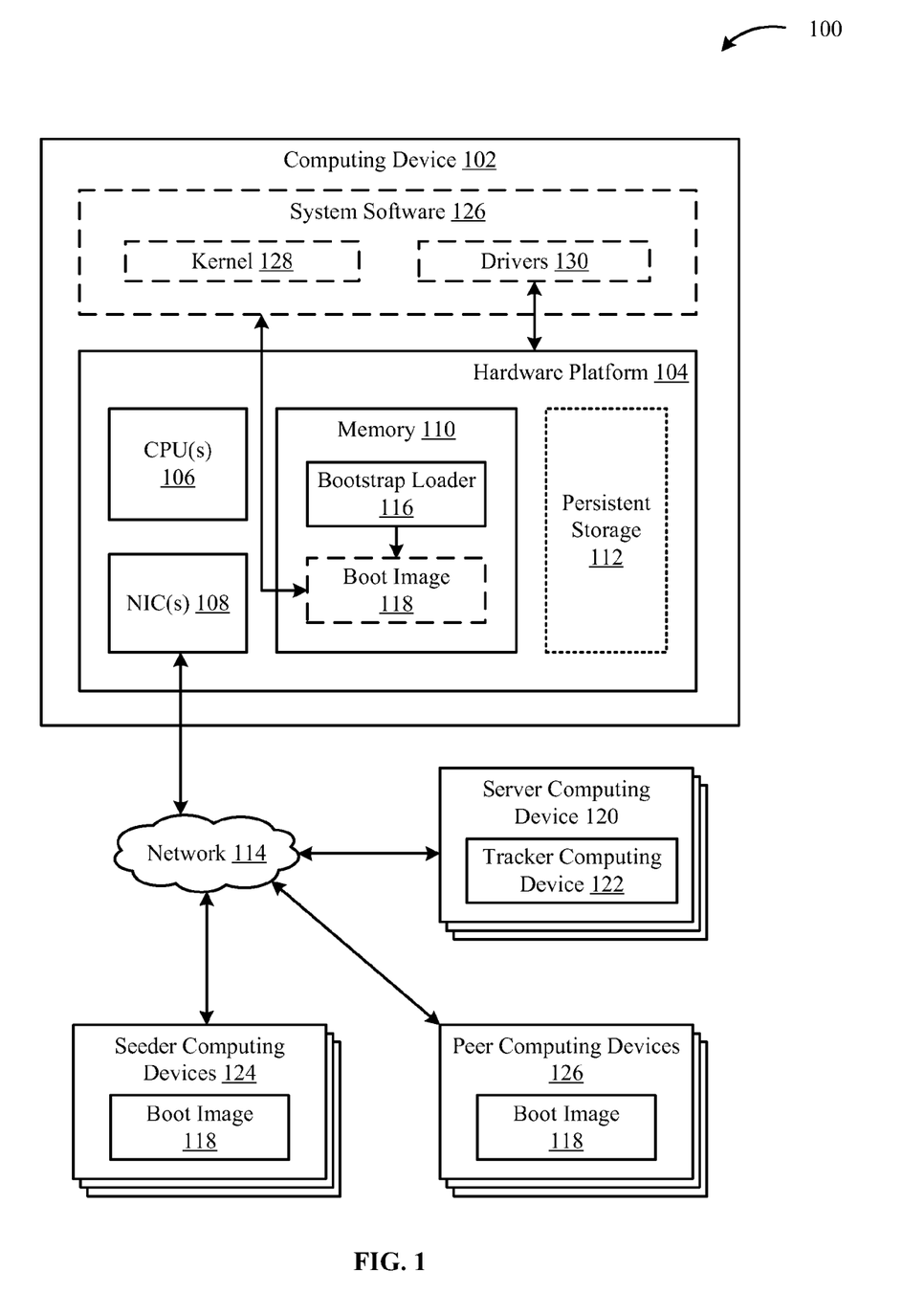
FIG. 1 is a block diagram of a system in which one or more embodiments of the present invention can be practiced.

FIG. 1 is a block diagram of a computer system 100 in which one or more embodiments of the present invention may be implemented. As shown, computer system 100 includes a computing device 102, server computing device(s) 120, seeder computing devices 124, and peer computing device(s) 126, which communicate between one another by way of a network 114, for example, the Internet. As shown, computing device 102 includes a hardware platform 104, which comprises one or more central processing units (CPUs) 106, a memory 110, an optional persistent storage 112, and one or more network interface cards (NICs) 108 that connect computing device 102 to network 114. Memory 110 includes a bootstrap loader 116, which, upon execution, is configured to download via network 114 a boot image (e.g., boot image 118) into memory 110. In one embodiment, bootstrap loader 116 is loaded into memory 110 from read-only memory (ROM) (not shown) included in hardware platform 104. In another embodiment, bootstrap loader 116 is loaded into memory 110 from an auxiliary storage, such as a flash memory device or a CD-ROM. In yet another embodiment, bootstrap loader 116 is loaded into memory 110 from a network storage device (e.g., a server computing device 120).

Bootstrap loader 116 may be obtained from a network storage device according to a variety of different techniques. In one embodiment, NIC 108 includes a non-volatile memory section (not shown) that stores firmware for the device. The firmware for NIC 108 may include UNDI (Universal Network Device Interface) application programming interfaces (APIs), which provide a device-agnostic way to gain access to network 114 without the use of any drivers, and are used for network 114 access during a network boot process prior to loading of any NIC 108 drivers. Once access to network 114 is made achievable through UNDI APIs, bootstrap loader 116 is fetched from the network storage device and loaded into memory 110.

As is described in greater detail below, bootstrap loader 116 is configured to communicate with one or more "tracker" modules executing on server computing devices 120 (such server computing devices hereinafter referred to as "tracker computing devices"). In some embodiments, tracker computing devices 122 communicate between one another and mirror their information to establish redundancy in attempt to decrease the chances of there being no available tracker computing device 122 to serve the boot image requests made by unbooted computing devices. Tracker computing devices 122 are configured to manage information about seeder computing devices 124 and peer computing devices 126—both of which are also referred to herein as "boot image servers"—that possess and are willing to serve a particular boot image that bootstrap loader 116 is requesting to download, for example, boot image 118. Tracker computing device 122 selects one or more boot image servers and passes their information to bootstrap loader 116. Bootstrap loader 116 then communicates directly (e.g., over HTTP) with the selected one or more boot image servers and downloads boot image 118 from the one or more boot image servers.

When boot image 118 is fully loaded into memory 110, computing device 102 extracts system software 126 from boot image 118 and executes system software 126. System software 126 may include a plurality of software layers, such as a kernel 128 that manages hardware resources provided by hardware platform 104 through various drivers 130. In one embodiment, system software 126 is an operating system (OS), such as an operating system that is commercially available. In another embodiment, system software 126 is a hypervisor that may be included as a component of VMware's vSphere® product, which is commercially available from VMware, Inc. of Palo Alto, Calif., that supports virtual machine applications running thereon.

Figure 2A:
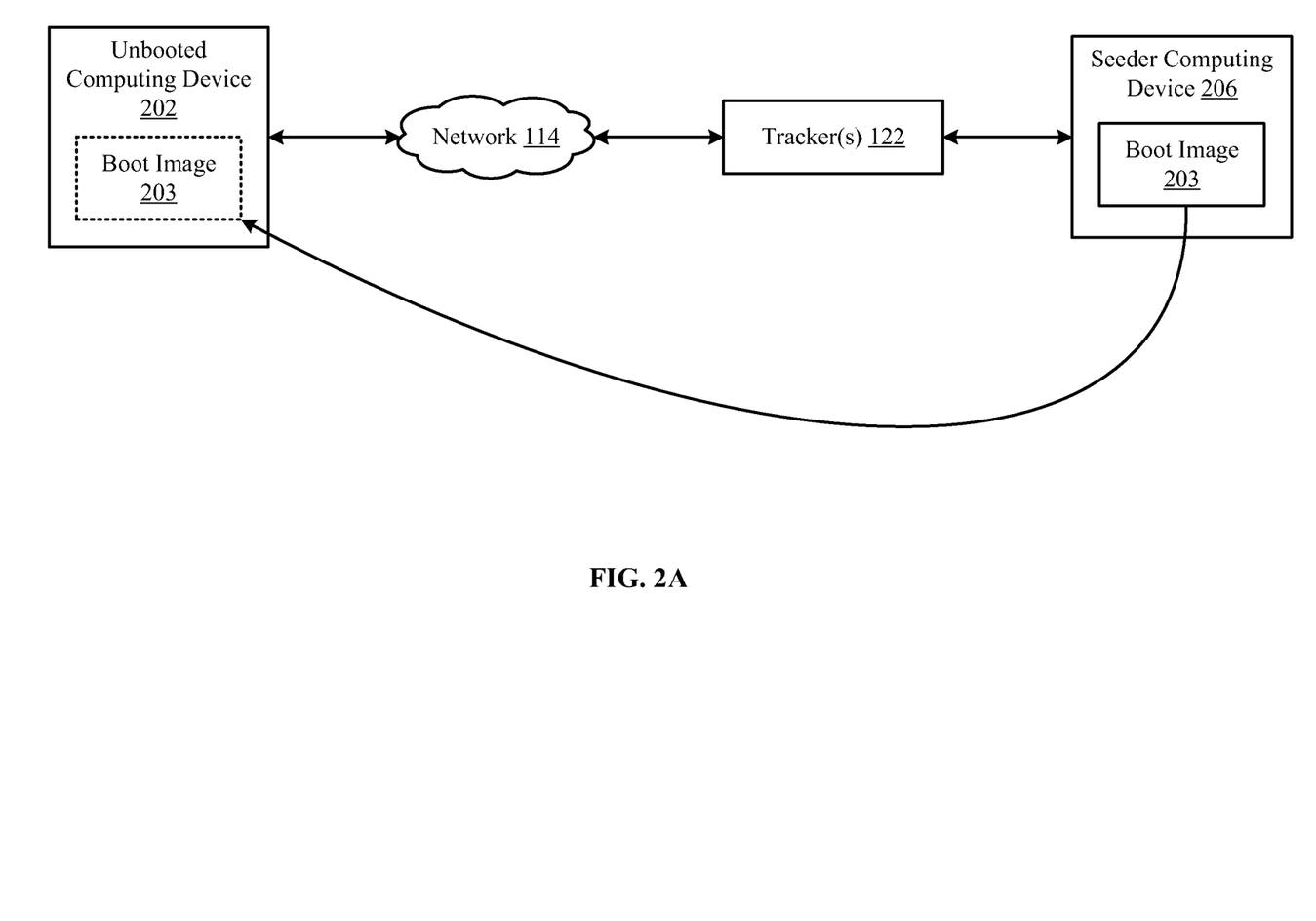
FIGS. 2A-2C illustrate different examples of how a particular boot image may be transmitted to an unbooted computing device in accordance with one or more embodiments of the present invention.
Figure 2B:
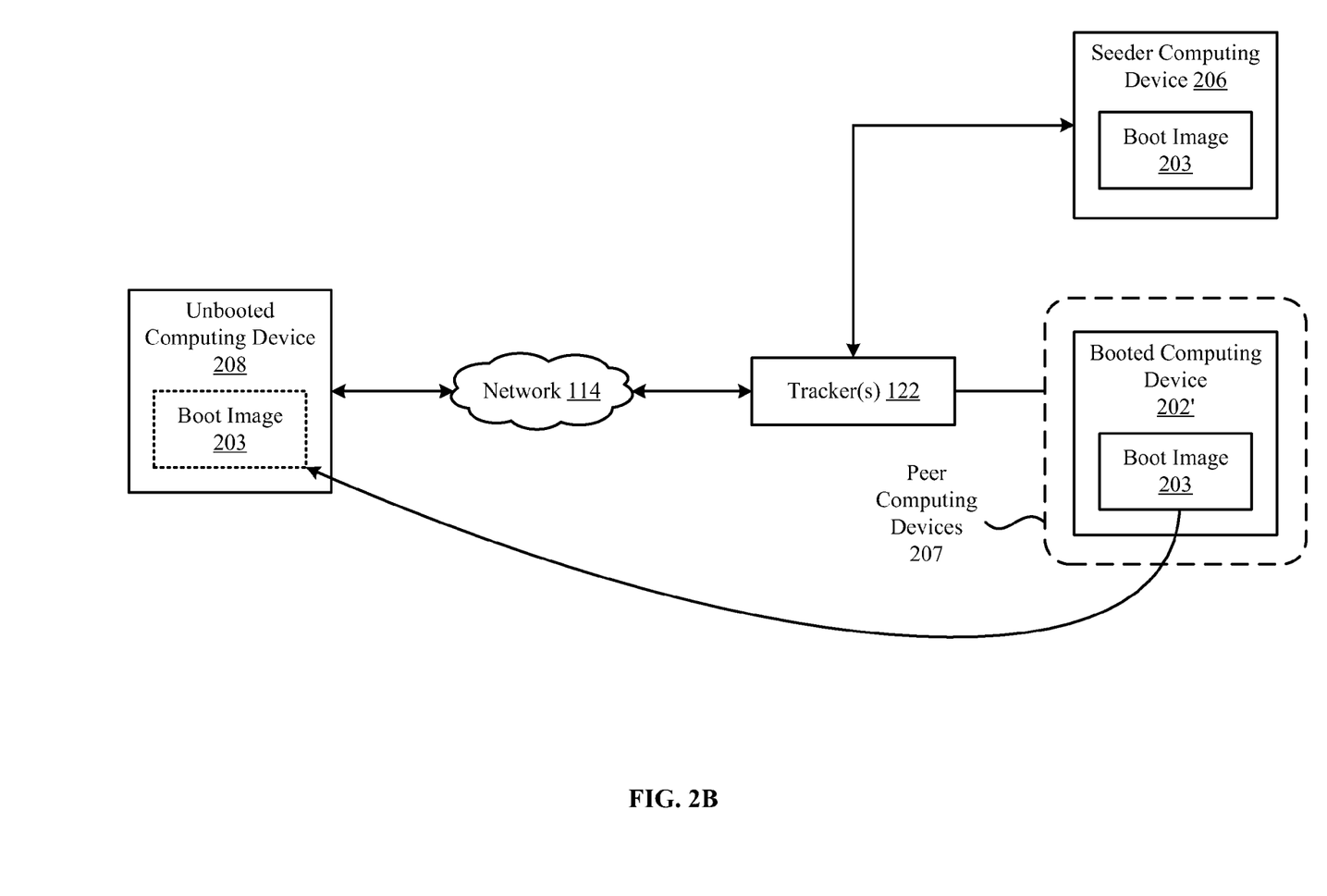
Figure 2C:
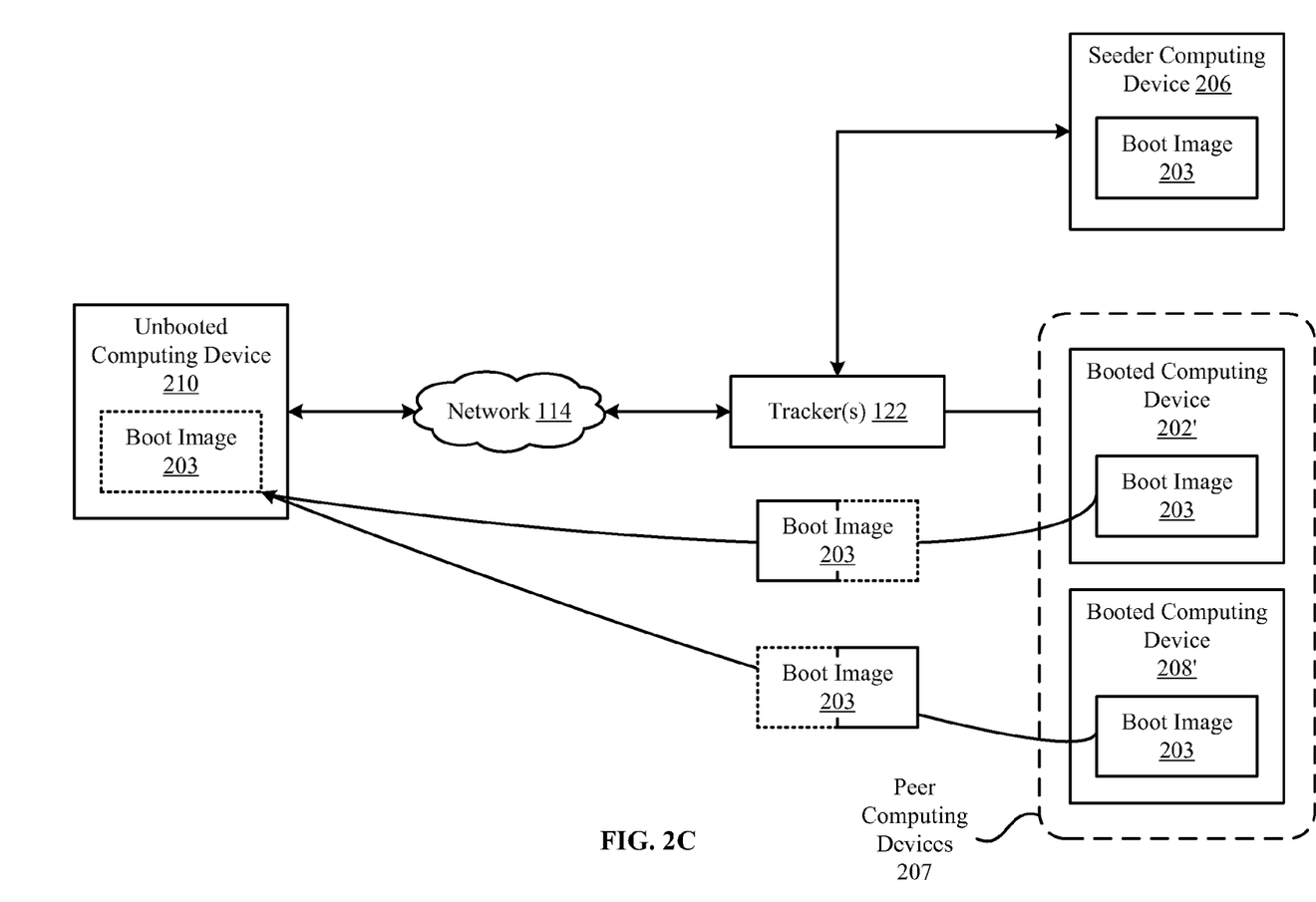

FIGS. 2A-2C illustrate different examples of how a particular boot image may be transmitted to an unbooted computing device in accordance with one or more embodiments of the present invention. In the example illustrated in FIG. 2A, an unbooted computing device 202 is seeking to download a boot image 203. In particular, when computing device 202 is powered-on, bootstrap loader 116 is loaded into memory 110 according to any of the techniques described above in conjunction with FIG. 1. When bootstrap loader 116 is loaded into memory 110, boot strap loader 116 locates a tracker computing device 122 and requests boot image 203 from tracker computing device 122. In response, tracker computing device 122 locates a seeder computing device 206 that possesses boot image 203. Tracker computing device 122 then routes to unbooted computing device 202 information associated with seeder computing device 206 so that unbooted computing device 202 can directly connect to seeder computing device 206 and download boot image 203. After unbooted computing device 202 downloads a complete copy of boot image 203 from seeder computing device 206 and verifies the integrity of boot image 203, for example, through a hash check of boot image 203, unbooted computing device 202 reports back to tracker computing device 122 whether or not it is willing to serve boot image 203 subsequently to any unbooted computing devices that are requesting to download the same boot image 203.

In one implementation, tracker computing device 122 identifies unbooted computing device 202 to be seeder computing device 206 if unbooted computing device 202 can upload the boot image 203 to unbooted computing devices that are requesting the download of the same boot image 203. In one implementation, peer software on a peer computing device that serves boot images to unbooted computing devices runs on top of the operating system of the peer computing device. Alternatively, the bootstrap loader 116 of FIG. 1 may support the serving operations, and then hand off such responsibilities to the operating system during the boot sequence.

In FIG. 2B, booted computing device 202' represents unbooted computing device 202 of FIG. 2A after it has downloaded boot image 203 and reported to tracker computing device 122 that it is willing to serve boot image 203 to unbooted computing devices. Accordingly, booted computing device 202' is known to tracker computing device 122 as one of peer computing devices 207 from which boot image 203 can be downloaded. Thus, tracker computing device 122 can choose between seeder computing device 206 and booted computing device 202' when an unbooted computer issues a request to tracker computing device 122 to download boot image 203. In the example illustrated in FIG. 2B, an unbooted computing device 208 is powered-on and requests from tracker computing device 122 information about boot image servers (e.g., seeder computing devices 124 and/or peer computing devices 126) from which boot image 203 can be downloaded. Tracker computing device 122 then makes decisions about whether seeder computing device 206 or booted computing device 202' is better-fit to serve boot image 203 to unbooted computing device 208 in the manner described below in conjunction with FIGS. 3-4. In the example shown, tracker computing device 122 selects booted computing device 202' to serve boot image 203, whereupon unbooted computing device 208 downloads boot image 203 from booted computing device 202'. Like unbooted computing device 202 of FIG. 2A, unbooted computing device 208 then reports back to tracker computing device 122 whether or not it is willing to serve boot image 203 subsequently to any unbooted computing devices that are requesting to download the same boot image 203.

In FIG. 2C, booted computing device 208' represents unbooted computing device 208 of FIG. 2B after it has downloaded boot image 203 and reported to tracker computing device 122 that it is willing to serve boot image 203 to unbooted computing devices. Accordingly, booted computing device 208' is also, like booted computing device 202', known to tracker computing device 122 as one of peer computing devices 207 from which boot image 203 can be downloaded. Thus, tracker computing device 122 can choose a boot image source from seeder computing device 206, booted computing device 202' and/or booted computing device 208' when an unbooted computing device issues a request to tracker computing device 122 to download boot image 203. In the example illustrated in FIG. 2C, an unbooted computing device 210 is powered-on and requests from tracker computing device 122 information about boot image servers from which boot image 203 can be downloaded. In the example shown, tracker computing device 122 selects booted computing device 202' and booted computing device 208' to serve boot image 203 to unbooted computing device 210. In response, unbooted computing device 210 downloads a first part of boot image 203 from booted computing device 202' and downloads a second part of boot image from booted computing device 208'. In one implementation, the bootstrap loader 116 downloads the boot image serially (e.g., consecutively) from booted computing device 202 and booted computing device 208. In another implementation, the bootstrap loader 116 downloads the boot image in parallel (e.g., concurrently) from booted computing device 202' and booted computing device 208'.

To cover cases where the boot image may be corrupted, the unbooted computing device 210 is configured to identify one or more corrupted portions of the boot image and then send a request to the tracker computing device 122 to receive a portion of the boot image from another computing device to replace the one or more corrupted portions of the boot image.

Figure 3:
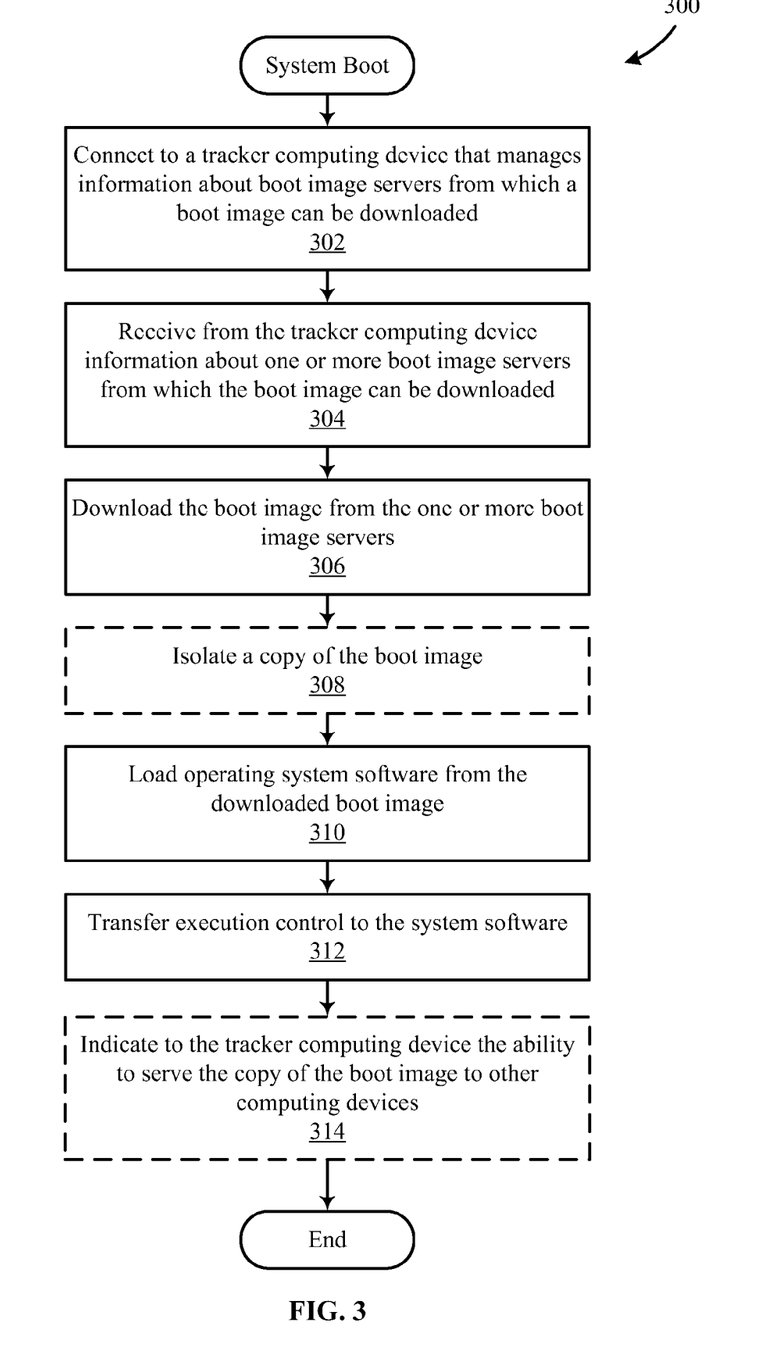
FIG. 3 is a flow diagram that illustrates a method for downloading a boot image via one or more boot image servers managed by a tracker computing device, according to one embodiment of the present invention.

FIG. 3 is a flow diagram that illustrates a method 300 for downloading a boot image via one or more boot image servers managed by tracker computing device 122, according to one embodiment of the present invention. For explanatory purposes, the method 300 is described as being carried out by the computing device 102 of FIG. 1. As shown, method 300 begins at step 302, where a bootstrap loader on an unbooted computing device (e.g., bootstrap loader 116 of computing device 102) connects to tracker computing device 122. As described above, tracker computing device 122 manages information about boot image servers (e.g., seeder computing devices 124 and/or peer computing devices 126) from which a boot image (e.g., boot image 118) can be downloaded. In one embodiment, bootstrap loader 116 is configured to connect with tracker computing device 122 via an internet domain name through which tracker computing device 122 may be accessed. In another embodiment, bootstrap loader 116 is configured to connect to tracker computing device 122 using an internet protocol (IP) address. In some embodiments, bootstrap loader 116 may prompt a user of computing device 102 to enter information associated with a tracker computing device 122 to which he or she desires to connect and bootstrap loader 116 performs a search for tracker computer device 122 and connects to tracker computer device 122 after finding it. In some cases, tracker computing device 122 may require bootstrap loader 116 to provide credentials before tracker computing device 122 transmits to bootstrap loader 116 information about boot image servers from which the requested boot image can be downloaded. Such credentials may be entered by the user when bootstrap loader 116 connects to tracker computing device 122, or may be hard-coded into bootstrap loader 116, for example, as secure socket layer (SSL) keys.

Upon connecting to tracker computing device 122, bootstrap loader 116 transmits information that is used to enable tracker computing device 122 to identify a boot image for bootstrap loader 116 to download. In one embodiment, bootstrap loader 116 transmits to tracker computing device 122 an identification code of a boot image that is known to tracker computing device 122, such as a particular version number of an operating system. In another embodiment, bootstrap loader 116 transmits to tracker computing device 122 information about computing device 102 so that tracker computing device 122 can return to bootstrap loader 116 a list of compatible boot images that are available for download. In this way, the user of computing device 102 may select the boot image that he or she wishes to download to computing device 102. In yet another embodiment, based on information about the computing device performing the download, the tracker computing device 122 can choose a particular boot image for download to the computing device.

At step 304 of FIG. 3, bootstrap loader 116 receives from tracker computing device 122 information about one or more boot image servers from which the boot image can be downloaded. In one embodiment, the boot image servers may request bootstrap loader 116 to provide credentials before bootstrap loader 116 is permitted to download the boot image, thereby adding an additional layer of security.

At step 306, bootstrap loader 116 downloads the boot image from the one or more boot image servers. In one embodiment, bootstrap loader 116 is configured to download from tracker computing device 122 checksum information about the boot image so that bootstrap loader 116 can verify the integrity of the boot image after it has been downloaded.

In some cases, depending on the configuration of the boot image, computing device 102 may need to modify the boot image in order to execute a boot of the operating system included therein. For example, some boot images are delivered in compressed form and need to be decompressed before an operating system can be extracted. In such cases, at step 308, bootstrap loader 116 optionally isolates a copy of the boot image, depending on the configuration of the boot image and also depending on whether computing device 102 plans to act as a peer computing device. Alternatively, after the computing device 102 generates a modified boot image by modifying the original boot image, the computer device 102 and/or another peer computing device can reconstruct the original boot image from the modified boot image.

At step 310, bootstrap loader 116 loads system software from the downloaded boot image, in a manner that does not affect the isolated copy of the boot image stored in memory (if any). At step 312, bootstrap loader 116 transfers execution control to the system software.

At step 314, bootstrap loader 116 optionally indicates to the tracker the ability to serve the copy of the boot image to other computing devices. In some cases, tracker computing device 122 may require bootstrap loader 116 to provide authentication credentials before allowing bootstrap loader 116 to serve the boot image to unbooted computing devices. In this way, tracker computing device 122 may reduce the security issues with bootstrap loaders 116 that pose as peer computing devices and then attempt to transmit harmful boot images to unbooted computing devices. Another approach is for the tracker computing device 122 to leverage a Trusted Platform Module (TPM) to verify the identity of a computing device 102 and to verify the authenticity of the boot image. A Trusted Platform Module offers facilities for the secure generation of cryptographic keys, and limitation of their use.

Although method steps 300 describe a process where bootstrap loader 116 downloads a single boot image from one or more seeder computing devices 124 and/or peer computing devices 126, embodiments are not so limited. In some cases, multiple boot images (e.g., operating system component packages) that collectively make up a bootable operating system are separately downloaded to the unbooted computing device. Accordingly, bootstrap loader 116 may be configured to connect to different tracker computing devices 122 to gather information about boot image servers that are able to serve the different files that need to be downloaded. Bootstrap loader 116 then downloads each of the files, and, when the files have been downloaded, bootstrap loader 116 is effectively able to boot the operating system.

Figure 4:
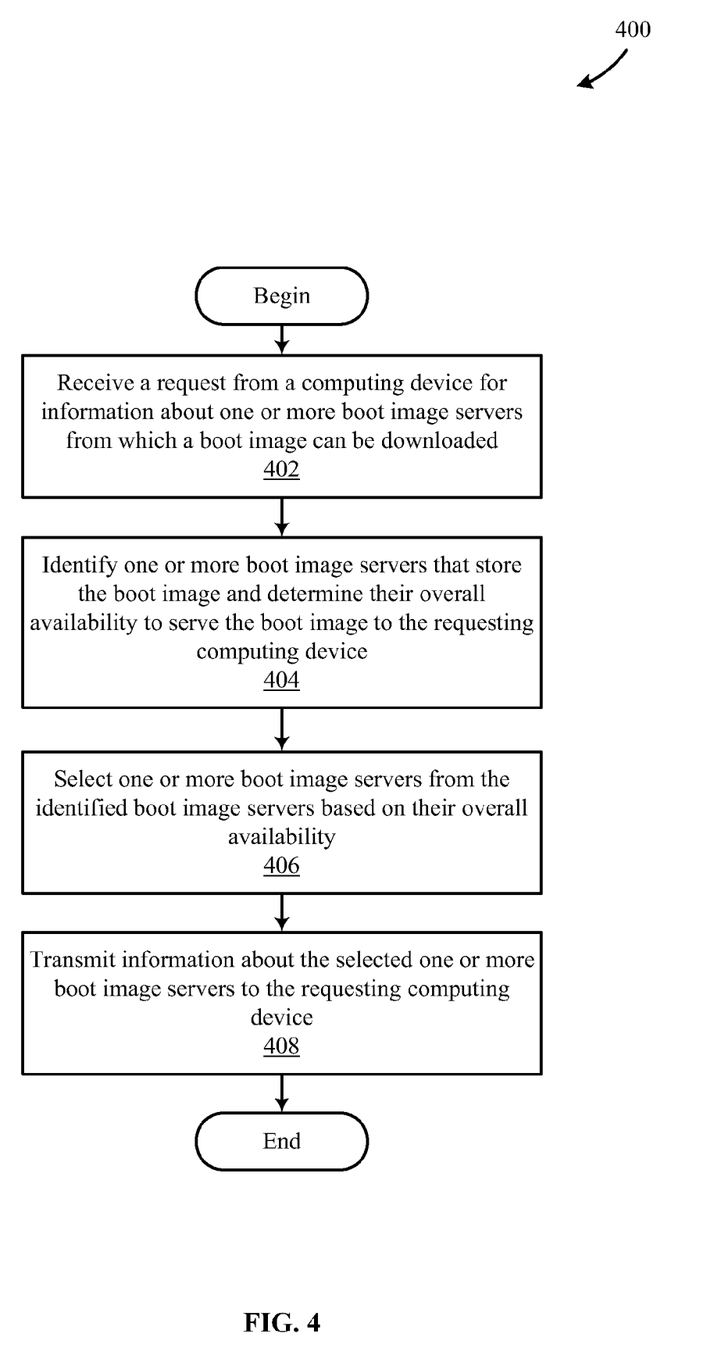
FIG. 4 is a flow diagram that illustrates a method for handling a request to download a boot image from one or more boot image servers, according to one embodiment of the present invention.

FIG. 4 is a flow diagram that illustrates a method 400 for handling a request to download a boot image from one or more boot image servers, according to one embodiment of the present invention. For explanatory purposes, the method 400 is described as being carried out by the tracker computing device 122 of FIG. 1. As shown in FIG. 4, method 400 begins at step 402, where tracker computing device 122 receives a request from computing device 102 for information about boot image servers (e.g., seeder computing devices 124 and/or peer computing devices 126) from which a boot image can be downloaded.

At step 404, tracker computing device 122 identifies one or more boot image servers that store the boot image and determines their overall availability to serve the boot image to the requesting computing device. In one embodiment, the overall availability of a boot image server is determined by a heuristic that considers various hardware-based properties of the boot image server, such as available bandwidth of the boot image server, the current CPU utilization of the boot image server, and the average up-time of the server. The overall availability of the boot image server may also be based on the role of the boot image server, for example, mission-critical boot image servers might be precluded from registering with tracker computing device 122 as a seeder computing device 124 or a peer computing device 126. In some cases, these properties advertised by the boot image server may be artificially set by the boot image server so that tracker computing device 122 does not need to be modified with various exceptions and rules that would make scaling tracker computing device 122 an otherwise difficult task.

At step 406, tracker computing device 122 selects one or more boot image servers from the identified boot image servers based on their overall availability. At step 408, tracker computing device 122 transmits information about the selected one or more boot image servers to the requesting computing device, whereupon computing device 102 downloads the boot image according to the techniques described herein.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of managing at a first computing device a distributed network boot system that includes a plurality of second computing devices, comprising:
   receiving at the first computing device a first request from a third computing device to download a boot image;
   identifying from the plurality of second computing devices one or more second computing devices that are capable of serving the boot image to the third computing device based on hardware properties advertised by the plurality of second computing devices, wherein the one or more second computing devices are selected based on a heuristic that considers hardware properties of the second computing devices, the hardware properties including available bandwidth, central processing unit utilization, latency, and average up-time, and at least one of the second computing devices advertises artificial values for the available bandwidth, central processing unit utilization, latency, and average up-time such that the at least one second computing device is not selected to serve the boot image to the third computing device;
   transmitting to the third computing device information about the one or more second computing devices that are capable of serving the boot image in order to enable the third computing device to download the boot image from the one or more second computing devices that are capable of serving the boot image;
   receiving from the third computing device an indication that the third computing device is willing to serve a portion of the boot image to other computing devices that request the boot image;
   receiving a second request from a fourth computing device to download the boot image; and
   transmitting to the fourth computing device information about the one or more second computing devices that are capable of serving the boot image and the third computing device in order to enable the fourth computing device to download the boot image from the one or more of the second computing devices that are capable of serving the boot image and the third computing device.

2. The method of claim 1, wherein a first portion of the boot image is served by one or more of the second computing devices that are capable of serving the boot image and a second portion of the boot image is served by the third computing device.

3. A non-transitory computer readable medium comprising instructions executable in a first computing device that manages a distributed network boot system that includes a plurality of second computing devices, wherein the instructions when executed in the first computing device cause the first computing device to carry out the steps of:
   receiving at the first computing device a first request from a third computing device to download a boot image;
   identifying from the plurality of second computing devices one or more second computing devices that are capable of serving the boot image to the third computing device based on hardware properties advertised by the plurality of second computing devices, wherein the one or more second computing devices are selected based on a heuristic that considers hardware properties of the second computing devices, the hardware properties including available bandwidth, central processing unit utilization, latency, and average up-time, and at least one of the second computing devices advertises artificial values for the available bandwidth, central processing unit utilization, latency, and average up-time such that the at least one second computing device is not selected to serve the boot image to the third computing device;
   transmitting to the third computing device information about the one or more second computing devices that are capable of serving the boot image in order to enable the third computing device to download the boot image from the one or more second computing devices that are capable of serving the boot image;
   receiving from the third computing device an indication that the third computing device is willing to serve a portion of the boot image to other computing devices that request the boot image;
   receiving a second request from a fourth computing device to download the boot image; and
   transmitting to the fourth computing device information about the one or more second computing devices that are capable of serving the boot image and the third computing device in order to enable the fourth computing device to download the boot image from the one or more of the second computing devices that are capable of serving the boot image and the third computing device.

4. The non-transitory computer readable medium of claim 3, wherein a first portion of the boot image is served by one or more of the second computing devices that are capable of serving the boot image and a second portion of the boot image is served by the third computing device.

5. A distributed network boot system comprising:
   a first computing device;
   a plurality of second computing devices; and
   a third computing device,
   wherein the first computing device is configured to:
      receive a first request from the third computing device to download a boot image;
      identify from the plurality of second computing devices one or more second computing devices that are capable of serving the boot image to the third computing device based on hardware properties advertised by the plurality of second computing devices, wherein the one or more second computing devices are selected based on a heuristic that considers hardware properties of the second computing devices, the hardware properties including available bandwidth, central processing unit utilization, latency, and average up-time, and at least one of the second computing devices advertises artificial values for the available bandwidth, central processing unit utilization, latency, and average up-time such that the at least one second computing device is not selected to serve the boot image to the third computing device;

transmit to the third computing device information about the one or more second computing devices that are capable of serving the boot image in order to enable the third computing device to download the boot image from the one or more second computing devices that are capable of serving the boot image;

receive from the third computing device an indication that the third computing device is willing to serve a portion of the boot image to other computing devices that request the boot image;

receive a second request from a fourth computing device to download the boot image; and transmit to the fourth computing device information about the one or more second computing devices that are capable of serving the boot image and the third computing device in order to enable the fourth computing device to download the boot image from the one or more of the second computing devices that are capable of serving the boot image and the third computing device.

6. The distributed network boot system of claim 5, wherein a first portion of the boot image is served by one or more of the second computing devices that are capable of serving the boot image and a second portion of the boot image is served by the third computing device.

* * * * *